(12) United States Patent
Kavehvash et al.

(10) Patent No.: US 11,287,721 B2
(45) Date of Patent: Mar. 29, 2022

(54) RECONFIGURABLE OPTICAL SIGNAL PROCESSING

(71) Applicants: Zahra Kavehvash, Tehran (IR); Somayyeh Koohi, Tehran (IR); Hossein Babashah, Tehran (IR)

(72) Inventors: Zahra Kavehvash, Tehran (IR); Somayyeh Koohi, Tehran (IR); Hossein Babashah, Tehran (IR)

(73) Assignee: SHARIF UNIVERSITY OF TECHNOLOGY, Tehran (IR)

( * ) Notice: Subject to any disclaimer, the term of this patent is extended or adjusted under 35 U.S.C. 154(b) by 425 days.

(21) Appl. No.: 16/407,195

(22) Filed: May 9, 2019

(65) Prior Publication Data

US 2019/0393672 A1 Dec. 26, 2019

Related U.S. Application Data

(60) Provisional application No. 62/668,829, filed on May 9, 2018.

(51) Int. Cl.
*G02F 1/35* (2006.01)
*G02F 1/01* (2006.01)

(52) U.S. Cl.
CPC .......... *G02F 1/3507* (2021.01); *G02F 1/3536* (2013.01); *G02F 1/0121* (2013.01)

(58) Field of Classification Search
CPC .... G02F 1/0121; G02F 1/3507; G02F 1/3536; H04B 10/299
See application file for complete search history.

(56) References Cited

U.S. PATENT DOCUMENTS

| 7,352,504 B2 | 4/2008 | Hirooka |
| 8,385,741 B2 * | 2/2013 | Okabe .................. G02F 1/3519 398/65 |

(Continued)

FOREIGN PATENT DOCUMENTS

CN 102608833 7/2012

OTHER PUBLICATIONS

Liu et al. "A fully reconfigurable photonic integrated signal processor." Nature Photonics 10, No. 3 (2016): 190.

(Continued)

*Primary Examiner* — Daniel Petkovsek
(74) *Attorney, Agent, or Firm* — Bajwa IP Law Firm; Haris Zaheer Bajwa

(57) ABSTRACT

A method for reconfigurable optical signal processing. The method includes generating a first pump pulse by propagating a first input pump through a first dispersive medium, generating a first modulated signal by applying a parametric nonlinear wave mixing process on an input optical signal and the first pump pulse, generating a first transformed signal of the input optical signal by propagating the first modulated signal through a second dispersive medium, generating a multiplied signal by multiplying the first transformed signal by a Green's function, generating a second pump pulse by propagating a second input pump through a third dispersive medium, generating a second modulated signal by applying the parametric nonlinear wave mixing process on the multiplied signal utilizing the second pump pulse, and generating a second transformed signal of the multiplied signal by propagating the second modulated signal through a fourth dispersive medium.

8 Claims, 15 Drawing Sheets

(56) References Cited

U.S. PATENT DOCUMENTS

```
8,870,060  B2     10/2014  Jalali
8,983,296  B2 *    3/2015  Watanabe .......... H04B 10/0773
                                                       398/76
9,291,509  B2 *    3/2016  Lipson .................... G01J 11/00
```

OTHER PUBLICATIONS

Li et al. "Reconfigurable optical signal processing based on a distributed feedback semiconductor optical amplifier." Scientific reports 6 (2016): 19985.
Sun et al. "Real-Time Optical Spectrum Fourier Transform With Time-Bandwidth Product Compression." IEEE Photonics Journal 10, No. 1 (2018): 1-14.
Goda et al. "Dispersive Fourier transformation for fast continuous single-shot measurements." Nature Photonics 7, No. 2 (2013): 102.
Wang, "Dispersive Fourier transformation for versatile microwave photonics applications." In Photonics, vol. 1, No. 4, pp. 586-612. Multidisciplinary Digital Publishing Institute, 2014.
Jannson, "Real-time Fourier transformation in dispersive optical fibers." Optics letters 8, No. 4 (1983): 232-234.
Li et al. "All-optical short-time fourier transform based on a temporal pulse-shaping system incorporating an array of cascaded linearly chirped fiber Bragg gratings." IEEE Photonics Technology Letters 23, No. 20 (2011): 1439-1441.

\* cited by examiner

RECONFIGURABLE OPTICAL SIGNAL PROCESSING

CROSS-REFERENCE TO RELATED APPLICATION

This application claims the benefit of priority from U.S. Provisional Patent Application Ser. No. 62/668,829, filed on May 9, 2018, and entitled "ULTRAFAST ANALOG FULLY RECONFIGURABLE TEMPORAL OPTICAL ON-CHIP SIGNAL PROCESSOR BASED ON DISPERSION," which is incorporated herein by reference in its entirety.

TECHNICAL FIELD

The present disclosure generally relates to signal processing, and particularly, to optical signal processing.

BACKGROUND

It may be advantageous for an integrated photonic structure to perform mathematical operations, such as convolution with an arbitrary function and pulse shaping in time domain, due to power-efficient and high-speed signal processing capability of photonic structures. Analog optical computing has gained widespread application in optical communications and real-time spectroscopy for processing optical signals in time domain.

In an optical system, signal processing is conventionally carried out by a digital signal processor (DSP), which is responsible for electronic sampling, as well as optical-to-electrical (OE) and electrical-to-optical (EO) conversions. As an approach to achieve power-efficient and high-speed signal processing capability in an optical network, a signal processing unit may be directly implemented in optical domain using a photonic signal processor to avoid a need for electronic sampling and OE/EO conversions.

An optical signal processor is usually designed to perform a specific function with no or very limited reconfigurability. For general-purpose signal processing, however, a photonic signal processor may be required to perform multiple functions with high reconfigurability. In conventional structures, reconfigurability may be achieved by controlling injection currents to active components (i.e. semiconductor-optical-amplifiers) of a signal processor which still yields specific functionality such as differentiation, integration, and Hilbert transformation. Consequently, implementing a new frequency transfer function or spatial transformation may require a new and complicated design.

There is, therefore, a need for a method for optically implementing arbitrary transfer function in time domain. There is also a need for a simple and reconfigurable photonic signal processor for general-purpose signal processing.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for reconfigurable optical signal processing. An exemplary method may include generating a first pump pulse by propagating a first input pump through a first dispersive medium, generating a first modulated signal of an input optical signal by applying a parametric nonlinear wave mixing process on the input optical signal utilizing the first pump pulse, generating a first transformed signal of the input optical signal by propagating the first modulated signal through a second dispersive medium, generating a multiplied signal by multiplying the first transformed signal by a Green's function, generating a second pump pulse by propagating a second input pump through a third dispersive medium, generating a second modulated signal of the multiplied signal by applying the parametric nonlinear wave mixing process on the multiplied signal utilizing the second pump pulse, and generating a second transformed signal of the multiplied signal by propagating the second modulated signal through a fourth dispersive medium. In an exemplary embodiment, each of the first input pump and the second input pump may include an optical wave.

In an exemplary embodiment, generating the first pump pulse by propagating the first input pump through the first dispersive medium may include generating a chirped pulse by propagating a Gaussian pulse through the first dispersive medium.

In an exemplary embodiment, generating the first modulated signal of the input optical signal by applying the parametric nonlinear wave mixing process on the input optical signal may include generating an idler signal by applying a four wave mixing (FWM) process on the input optical signal utilizing the first pump pulse and extracting the first modulated signal from the idler signal by passing the idler signal through a band-pass filter. In an exemplary embodiment, passing the idler signal through the band-pass filter may include passing the idler signal through a band-pass Bragg grating.

In an exemplary embodiment, propagating the first input pump through the first dispersive medium may include propagating the first input pump through a first spiral dispersive waveguide with a first linear positive-slope group velocity dispersion (GVD) $\ddot{\beta}_p$. In an exemplary embodiment, generating the first transformed signal by propagating the first modulated signal through the second dispersive medium may include obtaining a Fourier transform of the input optical signal by propagating the first modulated signal through a second spiral dispersive waveguide with a second linear positive-slope GVD $\ddot{\beta}_w$. In an exemplary embodiment, propagating the second input pump through the third dispersive medium may include propagating the second input pump through a third spiral dispersive waveguide with a third linear negative-slope GVD $\ddot{\beta}_p'$. In an exemplary embodiment, generating the second transformed signal by propagating the second modulated signal in the fourth dispersive medium may include obtaining an inverse Fourier transform of the multiplied signal by propagating the second modulated signal through a fourth spiral dispersive waveguide with a fourth linear negative-slope GVD $\ddot{\beta}_w'$.

In an exemplary embodiment, each of the first dispersive waveguide, the second dispersive waveguide, the third dispersive waveguide, and the fourth dispersive waveguide may include one of a single mode fiber, a linearly chirped fiber-brag-grating (FBG), a silicon nitride waveguide, a photonic crystal waveguide, or a Hydex waveguide.

In an exemplary embodiment, generating the multiplied signal may include passing the first transformed signal through a temporal optical modulator. In an exemplary embodiment, passing the first transformed signal through the temporal optical modulator may include passing the first transformed signal through a cascaded silicon Mach- Zehnder interferometer (MZI) optical modulator. In an exemplary embodiment, passing the first transformed signal through the cascaded silicon MZI optical modulator may include passing the first transformed signal through an optical waveguide and a beam splitter. An exemplary method may further include passing the first transformed signal through a phase modulator.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
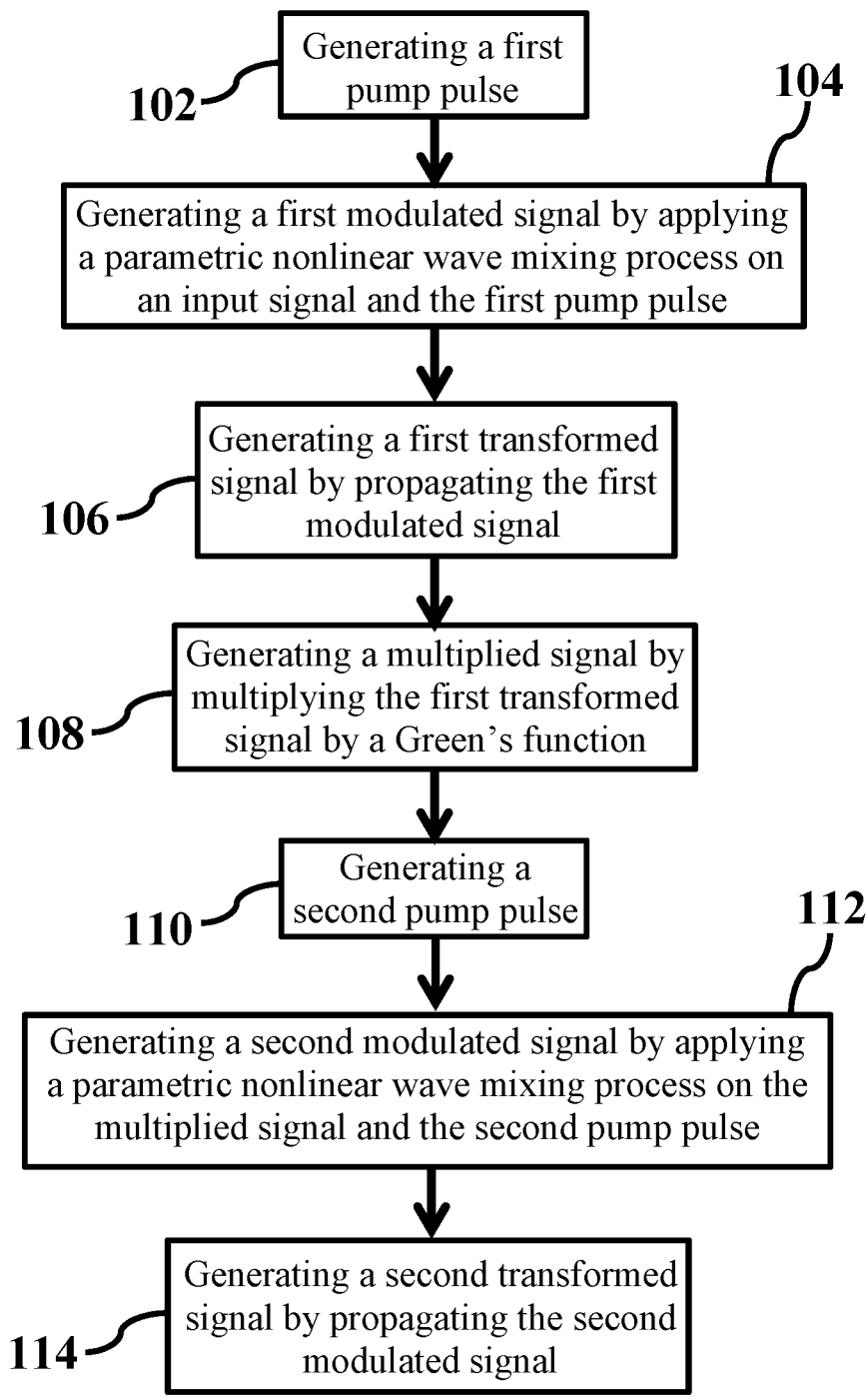
FIG. 1A shows a flowchart of a method for reconfigurable optical signal processing, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for reconfigurable optical signal processing. An exemplary method may include implementing a series of mathematical operations on an optical signal, including a transformation, a multiplication, and an inverse transformation. An exemplary optical signal may be transformed from a time domain to a frequency domain and multiplied by a respective function in the frequency-domain, followed by an inverse frequency transformation to obtain an output signal in the time domain. Based on a desired mathematical operation on the input signal, such as differentiation, integration, convolution, etc., the respective function in the frequency domain may be selected.

The above mentioned mathematical operations may be physically implemented utilizing a series of processing blocks that include respective hardware. For example, the transformation and the inverse transformation may be implemented utilizing exemplary dispersive waveguides by propagating the optical signal the through dispersive waveguides, and the multiplication may be implemented utilizing an optical modulator. To properly implement the mathematical operations, the waveguides may be engineered to satisfy predefined conditions. For example, dispersion or length of each waveguide may be determined to lie in a predefined range.

Time-domain Fourier transformation has been implemented through passing light via dispersive media. Dispersive Fourier transformation (DFT) maps the broadband spectrum of a conventionally ultrashort optical pulse into a time stretched waveform with its intensity profile mirroring the spectrum using chromatic dispersion. It is known that a dispersive element may be modeled as a linear time-invariant (LTI) system with a transfer function $H(\omega)H(\omega)$ given by $H(\omega)=|H(\omega)|e^{j\phi(\omega)}$, where $|H(\omega)|$ and $\phi(\omega)$ are magnitude and phase responses of a dispersive element at an angular frequency $\omega$, respectively. Mathematically, phase response $\phi(\omega)$ may be expanded in Taylor series. A propagation of an optical pulse through a dielectric element with up to second-order dispersion coefficients may be described with a transfer function and impulse response defined by the following:

$$H(\omega) = |H(\omega)|e^{j\phi_0}e^{j\dot{\phi}_0(\omega)}e^{j\frac{1}{2}\ddot{\phi}_0\omega^2} \xrightarrow{\mathcal{F}^{-1}} h(t) = e^{j\phi_0}e^{-j\frac{1}{2\ddot{\phi}_0}(t-\dot{\phi}_0)^2} \quad \text{Equation (1)}$$

where $\phi_0$ is a value of phase response $\phi(\omega)$ with respect to angular frequency $\omega$ at $\omega=0$, $\dot{\phi}_0$ and $\ddot{\phi}_0$ are values of first derivative and second derivative of phase response $\phi(\omega)$ at $\omega=0$, respectively, $\mathcal{F}^{-1}$ is an inverse Fourier transformation operator, t is a time variable, and h(t) is an inverse Fourier transform of transfer function $H(\omega)$.

In an exemplary embodiment, $|H(\omega)|$ may be engineered to be constant or have a weak dependence on angular frequency $\omega$ and $\phi(\omega)$ may be equal to $(\omega)L$, where $\beta(\omega)$ and L are a propagation constant and the waveguide's length, respectively. A time stretched waveform y(t) may be therefore approximated by the following:

$$y(t) = x(t) * h(t) = \int_{-\infty}^{\infty} x(\tau)e^{j\beta_0 L}e^{-j\frac{1}{2\dot{\beta}_0 L}(t-\tau-\dot{\beta}_0 L)^2} d\tau \quad \text{Equation (2)}$$

where x(t) is an input signal, $\beta_0$ is a value of propagation constant $\beta(\omega)$ at $\omega=0$, $\dot{\beta}_0$ and $\ddot{\beta}_0$ are values of first derivative and second derivative of propagation constant $\beta(\omega)$ with respect to angular frequency $\omega$ at $\omega=0$, respectively, and $\tau$ is an integration variable. In an exemplary embodiment, $\ddot{\beta}_0$ may also be referred to as group velocity dispersion (GVD), and may be indexed according to a reference to a dispersive medium, such as, $\ddot{\beta}_p$ or $\ddot{\beta}_w$, where p and w refer to different dispersive media. By setting $\tau_R=\tau+\dot{\beta}_0 L$, the following equation is obtained:

$$y(t) = e^{j\beta_0 L} \int_{-\infty}^{\infty} x(\tau_R - \dot{\beta}_0 L)e^{-j\frac{1}{2\ddot{\beta}_0 L}(t-\tau_R)^2} d\tau_R \quad \text{Equation (3)}$$

$$= e^{j\beta_0 L}e^{-j\frac{1}{2\ddot{\beta}_0 L}t^2} \int_{-\infty}^{\infty} x(\tau_R - \dot{\beta}_0 L)e^{-j\frac{1}{2\ddot{\beta}_0 L}\tau_R^2}e^{+j\frac{1}{\ddot{\beta}_0 L}t\tau_R} d\tau_R$$

In an exemplary embodiment, to compensate for the term $$e^{-j\frac{1}{2\ddot{\beta}_0 L}\tau_R^2},$$

input signal x(t) may be modulated with a quadratic phase modulation according to the following:

$$x(t)=x_0(t)e^{+ja(t+\dot{\beta}_0 L)^2} \quad \text{Equation (4)}$$

where $x_0(t)$ is a modulated signal, and a is a chirp factor.

Setting $$a = \frac{1}{2\ddot{\beta}_0 L}$$

yields the following equation for y(t):

$$\tilde{y}(t) = e^{j\left(\beta_0 L - \frac{1}{2\ddot{\beta}_0 L}t^2\right)} \int_{-\infty}^{\infty} x_0(\tau_R - \dot{\beta}_0 L)e^{j\frac{1}{\ddot{\beta}_0 L}t\tau_R} d\tau_R \quad \text{Equation (5)}$$

$$= e^{j\left(\beta_0 L + \frac{t+\dot{\beta}_0 L}{\ddot{\beta}_0 L}\dot{\beta}_0 L - \frac{1}{2\ddot{\beta}_0 L}t^2\right)} X_0(\omega)\Big|_{\omega=\frac{t+\dot{\beta}_0 L}{\ddot{\beta}_0 L}}$$

where $\tilde{y}(t)$ is a modulated time stretched waveform, and $X_0(\omega)=\mathcal{F}\{x_0(t)\}$ is a Fourier transform of modulated signal $x_0(t)$.

In an exemplary embodiment, the phase modulation may be implemented utilizing a parametric nonlinear wave mixing process, such as four wave mixing (FWM). In this exemplary approach, a pulse, such as a Gaussian pulse, may propagate through a dispersive medium. As a result, the pulse may undergo temporal broadening and may be linearly chirped. The broadened linearly chirped signal may be then used in the nonlinear wave mixing process as a pump pulse. A resultant output signal, also called an idler signal, is calculated as follows:

$$E_{idler}(t)=E_{pump}^2(t)E_{input}^+(t) \quad \text{Equation (6)}$$

where $E_{idler}(t)$, $E_{pump}(t)$, and $E_{input}(t)$ are electric field amplitudes of the output signal, the pump pulse, and the input signal in the nonlinear wave mixing process. In an exemplary embodiment, an output electric field frequency $\omega_{idler}$, given by $\omega_{idler}=2\omega_{pump}-\omega_{input}$, may be separated from input frequency $\omega_{input}$ and pump pulse frequency $\omega_{pump}$ utilizing a band-pass filter.

FIG. 1A shows a flowchart of a method for reconfigurable optical signal processing, consistent with one or more exemplary embodiments of the present disclosure. An exemplary method 100 may include generating a first pump pulse by propagating a first input pump through a first dispersive medium (step 102), generating a first modulated signal of an input optical signal by applying a parametric nonlinear wave mixing process on the input optical signal and the first pump pulse (step 104), generating a first transformed signal of the input optical signal by propagating the first modulated signal through a second dispersive medium (step 106), generating a multiplied signal by multiplying the first transformed signal by a Green's function (step 108), generating a second pump pulse by propagating a second input pump through a third dispersive medium (step 110), generating a second modulated signal of the multiplied signal by applying the parametric nonlinear wave mixing process on the multiplied signal utilizing the second pump pulse (step 112), and generating a second transformed signal of the multiplied signal by propagating the second modulated signal through a fourth dispersive medium (step 114). In an exemplary embodiment, each of the first input pump and the second input pump may include an optical wave.

Figure 2:
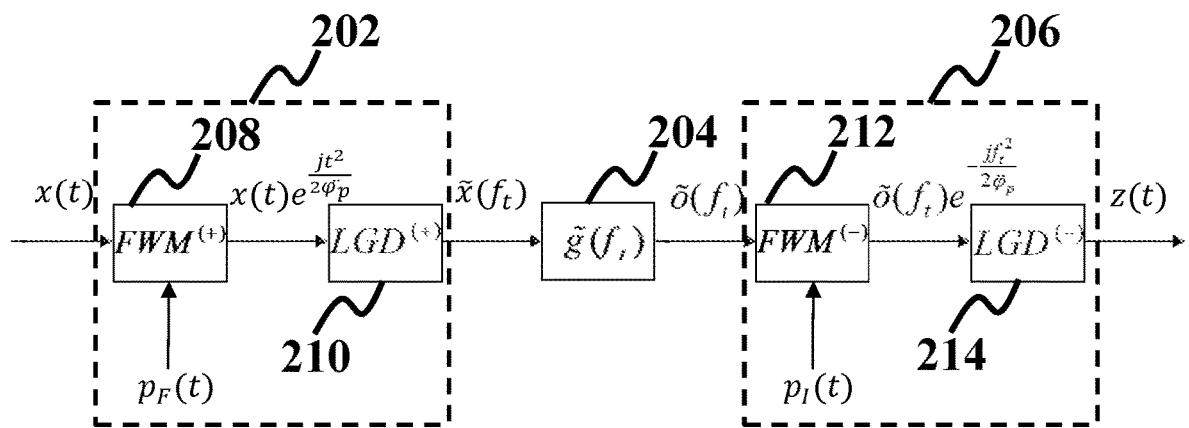
FIG. 2 shows a block diagram of a system for reconfigurable optical signal processing, consistent with one or more exemplary embodiments of the present disclosure.

FIG. 2 shows a block diagram of a system for reconfigurable optical signal processing, consistent with one or more exemplary embodiments of the present disclosure. In an exemplary embodiment, different steps of method 100 may be implemented utilizing an exemplary system 200. In an exemplary embodiment, system 200 may include a first transformation unit 202, a multiplication unit 204, and a second transformation unit 206. Referring to FIGS. 1A and 2, in an exemplary embodiment, steps 102-106 may be implemented utilizing first transformation unit 202. In an exemplary embodiment, step 108 may be implemented utilizing multiplication unit 204. In an exemplary embodiment, steps 110-114 may be implemented utilizing second transformation unit 206.

Figure 3:
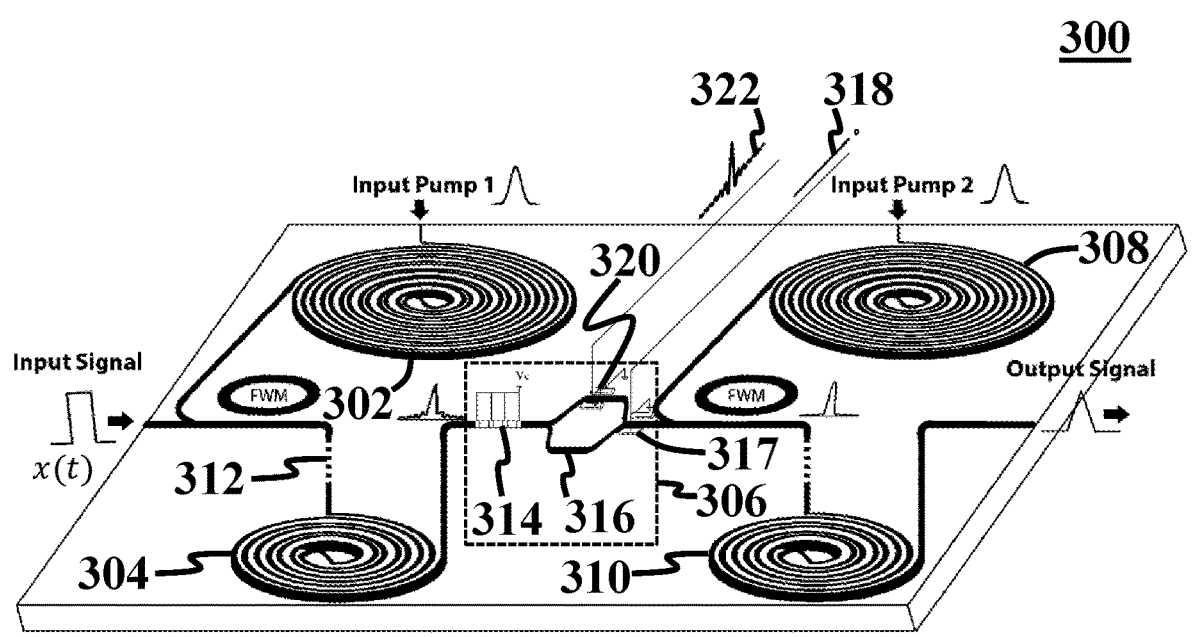
FIG. 3 shows a schematic of a photonic integrated circuit for reconfigurable optical signal processing, consistent with one or more exemplary embodiments of the present disclosure.

FIG. 3 shows a schematic of a photonic integrated circuit (PIC) for reconfigurable optical signal processing, consistent with one or more exemplary embodiments of the present disclosure. In an exemplary embodiment, different units of system 200 may be implemented utilizing an exemplary PIC 300. In an exemplary embodiment, PIC 300 may include a first dispersive waveguide 302, a second dispersive waveguide 304, a temporal optical modulator 306, a third dispersive waveguide 308, and a fourth dispersive waveguide 310. Referring to FIGS. 2 and 3, in an exemplary embodiment, first transformation unit 202 may be implemented utilizing first dispersive waveguide 302 and second dispersive waveguide 304. In an exemplary embodiment, multiplication unit 204 may be implemented utilizing temporal optical modulator 306. In an exemplary embodiment, second transformation unit 206 may be implemented utilizing third dispersive waveguide 308 and fourth dispersive waveguide 310.

Referring again to FIGS. 1A, 2, and 3, in an exemplary embodiment, step 102 may include generating the first pump pulse by propagating a first input pump $p_F(t)$ through a first dispersive medium 208. In an exemplary embodiment, first input pump $p_F(t)$ may include a Gaussian pulse. In an exemplary embodiment, first dispersive medium 208 may include a dispersive waveguide similar to first dispersive waveguide 302. In an exemplary embodiment, first dispersive waveguide 302 may include a length $L_p$ and a GVD $\ddot{\beta}_p$, where p refers to parameters associated with first dispersive waveguide 302. In an exemplary embodiment, propagating the Gaussian pulse through first dispersive waveguide 302 may generate a chirped pulse which may be proportional to $$e^{j\frac{t^2}{2\ddot{\beta}_p L_p}},$$

as stated in Equation (5).

Figure 1B:
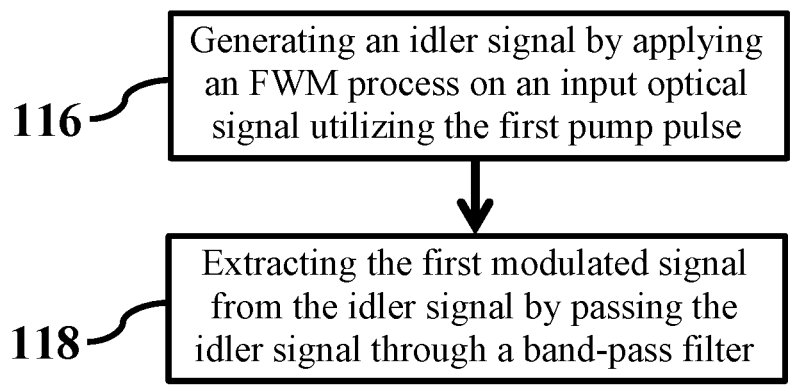
FIG. 1B shows a flowchart for generating a first modulated signal of an input optical signal by applying a parametric nonlinear wave mixing process on an input optical signal, consistent with one or more exemplary embodiments of the present disclosure.

For further detail with regards to step 104, FIG. 1B shows a flowchart for generating the first modulated signal of the input optical signal by applying the parametric nonlinear wave mixing process on the input optical signal, consistent with one or more exemplary embodiments of the present disclosure. In an exemplary embodiment, step 104 may include generating an idler signal by applying an FWM process on an input optical signal x(t) and the first pump pulse (step 116) and extracting the first modulated signal from the idler signal by passing the idler signal through a band-pass filter (step 118).

In further detail with respect to step 116, the idler signal may refer to the output of the FWM process. In an exemplary embodiment, the FWM process may include a nonlinear process that comes from a third-order optical nonlinearity. This process may happen when more than one wave is propagating inside a nonlinear medium such as an optical fiber. In a case of two waves such as the input optical pulse and the first pump pulse with different frequencies of $f_{input}$ and $f_{pump}$, a refractive index modulation may occur in the nonlinear medium, which may generate two new frequencies of $f_1=2f_{input}-f_{pump}$ and $f_2=2f_{pump}-f_{input}$ in the idler signal frequency $f_{idler}$.

In further detail with regards to step 118, to separate idler signal frequency $f_{idler}$ from input frequency $f_{input}$ and pump pulse frequency $f_{pump}$, in an exemplary embodiment, step 118 may include passing the idler signal through the band-pass filter. Referring again to FIG. 3, in an exemplary embodiment, the band-pass filter may include a Bragg grating 312. In an exemplary embodiment, Bragg grating may refer to a type of distributed reflectors that is constructed in a short segment of an optical fiber to reflect particular wavelengths of light.

In further detail with regards to step 106, the first transformed signal of the input optical signal may be generated by propagating the first modulated signal through the second dispersive medium. Referring again to FIGS. 2 and 3, a first transformed signal $\tilde{x}(f_t)$ may be generated by propagating the first modulated signal through a second dispersive medium 210. In an exemplary embodiment, first transformed signal $\tilde{x}(f_t)$ may be a Fourier transform of input optical signal x(t). In an exemplary embodiment, second dispersive medium 210 may include a dispersive waveguide similar to second dispersive waveguide 304. In an exemplary embodiment, second dispersive waveguide 304 may include a length $L_w$ and a GVD $\ddot{\beta}_w$, where w refers to parameters associated with second dispersive waveguide 304.

For further detail with regards to first dispersive waveguide 302 and second dispersive waveguide 304, a length of an exemplary waveguide, translated to its focal length f in DFT usage, may be approximated as follows:

$$f = \frac{1}{2\ddot{\beta}_0 b} \qquad \text{Equation (7)}$$

where $\ddot{\beta}_0$ is the GVD of the exemplary waveguide, and b is the chirpiness coefficient in the modulation chirp function $$e^{-j\frac{1}{2\ddot{\beta}_0 L} t_R^2}$$

applied to the input optical signal in Equation (3). By setting the chirpiness coefficient as $$b = \frac{1}{2\ddot{\beta}_p L_p}$$

for first dispersive waveguide 302, the following may be derived from Equation (4):

$$f = L_p \frac{\ddot{\beta}_p}{\ddot{\beta}_w} = L_w \qquad \text{Equation (8)}$$

According to Equation (8), in an exemplary embodiment, length $L_w$ of second dispersive waveguide 304 may satisfy a condition defined by the following:

$$0.9 \times L_p \frac{\ddot{\beta}_p}{\ddot{\beta}_w} < L_w < 1.1 \times L_p \frac{\ddot{\beta}_p}{\ddot{\beta}_w} \qquad \text{Inequation (1)}$$

where, in an exemplary embodiment, the lower and upper values of Inequation (1) may approximate the equality of Equation (8) with a sufficiently high precision for practical applications.

In an exemplary embodiment, increasing the value of b may help in decreasing the waveguide lengths to practical values required for photonic integrated circuit implementations. In an exemplary embodiment, a limiting factor may be an input pulse width which may impose a lower limit on the value of chirp coefficient b. In an exemplary embodiment, chirpiness factor b may be set large enough to provide enough number of different frequencies, as well as enough number of periods in each frequency in the pulse duration time. As an example, for exemplary waveguide with GVD $\ddot{\beta}_0$ equal to about $$1.043 \times 10^9 \frac{\text{ps}^2}{\text{km}},$$

a pulse width of about 100 ps may impose a lower limit of $$\left(\frac{1}{T}\right)^2 = 10^{-4} \text{ps}^{-2}$$

on chirp factor b, where T is the input pulse width. Hence, length L of the waveguide may be limited to a maximum value of 5 mm. This limitation may be formulized by the following:

$$L < \frac{T}{20\ddot{\beta}_0} \qquad \text{Inequation (2)}$$

Another factor that may be considered is an operation length which may apply a lower limit on the waveguide length. The operation length may be defined as the length of the generated chirp pulse ready for multiplication, which may be set larger than the maximum required length for computation. This limitation may be formulized by the following:

$$\frac{\tau_{max}}{2\ddot{\beta}\Omega} < L \qquad \text{Inequation (3)}$$

where $\omega$ is a spectral bandwidth of the pump pulse, and $\tau_{max}$ is a maximum threshold of computation time. In an exemplary embodiment, $\tau_{max}$ may be set based on a maximum required time length for computation, which may be equal to a group delay dispersion (GDD) of input optical signal x(t).

Based on Inequations (2) and (3), in an exemplary embodiment, length $L_p$ of first dispersive waveguide 302 may satisfy a condition defined by the following:

$$\frac{\tau_{max}}{2\ddot{\beta}\Omega} < L_p < \frac{T_i}{20\ddot{\beta}_0} \qquad \text{Inequation (4)}$$

where $T_i$ is a width of input optical signal x(t).

In an exemplary embodiment, first dispersive waveguide 302 and second dispersive waveguide 304 may have linear (or constant) positive-slope GVDs $\ddot{\beta}_p$ and $\ddot{\beta}_w$, respectively. In an exemplary embodiment, an exemplary waveguide with a linear and positive-slope GVD with respect to wavelength may perform a Fourier transform on an optical temporal signal. In an exemplary embodiment, a waveguide's GVD may be adapted through tailoring the size of the waveguide cross section. A GVD for a given waveguide cross section may be approximated as a sum of material's GVD and its waveguide's GVD. While the material's GVD is typically ordinary at short wavelengths and anomalous at longer wavelengths, the waveguide's GVD may exhibit an opposite behavior. Therefore, in an exemplary embodiment, by adjusting the waveguide cross section, the waveguide dispersion may be tailored to engineer the total dispersion. A constant GVD $\ddot{\beta}_0$ of an exemplary waveguide means that a group delay $\Delta\tau$ given by $\Delta\tau=\ddot{\beta}_0 L$ is a linear function of frequency, according to the following:

$$\frac{\partial \dot{\beta}_0}{\partial \omega} = \ddot{\beta}_0 = C \longrightarrow \dot{\beta}_0 = \ddot{\beta}_0 \Delta\omega \longrightarrow \Delta\tau = \dot{\beta}_0 L = (\ddot{\beta}_0 L)\Delta\omega \qquad \text{Equation (9)}$$

where C is a constant.

In an exemplary embodiment, Equation (9) may result in a linear time-frequency mapping, i.e., the resultant frequency samples may be placed uniformly in the time domain, which may lead to a uniform Fourier transform (FT).

In an exemplary embodiment, a linear GVD may lead to nonlinear functionality of group delay versus frequency, according to the following:

$$\frac{\partial^2 \dot{\beta}_0}{\partial \omega} = \beta_0^{(3)} = C \rightarrow \ddot{\beta}_0 =$$
$$\beta_0^{(3)}\Delta\omega^2 + \ddot{\beta}_0 \Delta\omega \rightarrow \Delta\tau = \dot{\beta}_0 L = (\beta_0^{(3)} L)\Delta\omega^2 + (\ddot{\beta}_0 L)\Delta\omega \qquad \text{Equation (10)}$$

where $\beta_0^{(3)}$ is a value of third derivative of propagation constant $\beta(\omega)$ with respect to angular frequency $\omega$ at $\omega=0$.

In an exemplary embodiment, each of first dispersive waveguide 302, second dispersive waveguide 304, third dispersive waveguide 308, and fourth dispersive waveguide 310 may include one of a single mode fiber, a linearly chirped fiber-brag-grating (FBG), a silicon nitride waveguide, a photonic crystal waveguide, or a Hydex waveguide. All these waveguides may be capable of coupling an optical signal passing through an optical communication line to and/or from them through tapered couplers. Furthermore, they may have linear or constant GDD in an optical communication spectrum. In an exemplary embodiment, each of first dispersive waveguide 302, second dispersive waveguide 304, third dispersive waveguide 308, and fourth dispersive waveguide 310 may have a spiral shape.

Referring again to FIGS. 1A, 2, and 3, in an exemplary embodiment, step 108 may include generating a multiplied signal $õ(f_t)$ by multiplying first transformed signal $\tilde{x}(f_t)$ by a Green's function $\tilde{g}(f_t)$ utilizing multiplication unit 204. In an exemplary embodiment, Green's function $\tilde{g}(f_t)$ may be utilized to implement arbitrary time-domain operations such as integration, differentiation, and convolution. In an exemplary embodiment, multiplied signal $õ(f_t)$ at the output of multiplication unit 204 may be obtained as follows:

$$o(t) = x(t) * g(t) = \int x(\tau) g(t-\tau) d\tau \qquad \text{Equation (11)}$$

where g(t) and o(t) are the Green's function and the multiplied signal in the time-domain, respectively, and * is a convolution operator. This operation may be written in the Fourier domain as a simple multiplication, according to the following:

$$õ(f_t) = \tilde{x}(f_t) \tilde{g}(f_t) \qquad \text{Equation (12)}$$

where tilde indicates the Fourier transform of signals and $f_t$ is a temporal frequency variable. Given that first transformed signal $\tilde{x}(f_t)$ and Green's function $\tilde{g}(f_t)$ are both in Fourier domain, their multiplication is equivalent to their convolution in the time domain.

In an exemplary embodiment, multiplication unit 204 may include a temporal optical modulator similar to temporal optical modulator 306. In an exemplary embodiment, temporal optical modulator 306 may include an integrated optical modulator with a high modulation speed, a small footprint and a large optical bandwidth, which may enable on-chip optical interconnects. In an exemplary embodiment, temporal optical modulator 306 may include a cascaded silicon Mach-Zehnder interferometer (MZI) optical modulator. In an exemplary embodiment, the cascaded silicon MZI optical modulator may include an optical waveguide 314 and a beam splitter. An exemplary beam splitter 316 may include Y-branches. In an exemplary embodiment, an output signal of optical waveguide 314 may be interfered constructively or destructively upon having zero or π radian phase shifts. Using an MZI configuration, an optical switch may be made by introducing a phase shift in the output signal as the waveguide voltage changes.

In an exemplary embodiment, temporal optical modulator 306 may further include a phase modulator. An exemplary phase modulator 317 may include a p-n diode as a phase shifter. An exemplary reverse bias 318 on the p-n diode may create a depletion region which may change in size as a function of voltage. In an exemplary embodiment, a change in a number of carriers in temporal optical modulator 306 may introduce a small change in a refractive index of temporal optical modulator 306 and may accordingly lead to an optical phase shift and hence modulation. As this effect may be very fast, an exemplary p-n junction 320 may be used in an arm of the Y-branch of beam splitter 316 to construct a high-speed modulator by placing it inside an interferometer. In an exemplary embodiment, an electrical signal 322 may be applied to p-n junction 320. Applying reverse voltages to p-n junction may lead to a phase shift between two different paths of the Y-branch.

Referring again to FIGS. 1A, 2, and 3, in an exemplary embodiment, step 110 may include generating the second pump pulse by propagating a second input pump $p_f(t)$ through a third dispersive medium 212. In an exemplary embodiment, second input pump $p_f(t)$ may include a Gaussian pulse. In an exemplary embodiment, third dispersive medium 212 may include a dispersive waveguide similar to third dispersive waveguide 308.

In an exemplary embodiment, step 114 may include generating a second transformed signal z(t) of multiplied signal $õ(f_t)$ by propagating the second modulated signal through a fourth dispersive medium 214. In an exemplary embodiment, second transformed signal z(t) may be an inverse Fourier transform of multiplied signal $õ(f_t)$, and therefore, may be equal to the multiplied signal in the time domain o(t). In an exemplary embodiment, fourth dispersive medium 214 may include a dispersive waveguide similar to fourth dispersive waveguide 310.

In an exemplary embodiment, third dispersive waveguide 308 and fourth dispersive waveguide 310 may have linear (or constant) negative-slope GVDs $\ddot{\beta}_q$ and $\ddot{\beta}_v$, respectively, for performing inverse-Fourier-transformation (IFT) on multiplied signal $õ(f_t)$ to yield a desired result of convolution utilizing Green's function $\tilde{g}(f_t)$. In an exemplary embodiment, q and v may refer to parameters associated with third dispersive waveguide 308 and fourth dispersive waveguide 310, respectively. Inverse Fourier transformation requires a conjugate kernel of FT, and hence, according to Equation (5), a media with negative GVD may be needed for performing IFT. It is worth to mention that FT or IFT of a signal s(t) may be used instead of each other, considering that $IFT\{s(t)\} = \tilde{s}(-f_t)$. By substituting $\ddot{\beta}_0$ with a negative GVD $-\ddot{\beta}_0$ in Equation (5), the following is obtained:

$$o(t) = e^{j\left(\ddot{\beta}_0 L - \frac{1}{2\ddot{\beta}_0 L} t^2\right)} \int_{-\infty}^{\infty} õ(f_R - \ddot{\beta}_0 L) e^{-j \frac{1}{\ddot{\beta}_0 L} tf_R} df_R \qquad \text{Equation (13)}$$
$$= e^{j\left(\ddot{\beta}_0 L + \frac{t - \ddot{\beta}_0 L}{\ddot{\beta}_0 L} \ddot{\beta}_0 L - \frac{1}{2\ddot{\beta}_0 L} t^2\right)} o(t')\Big|_{t' = \frac{t + \ddot{\beta}_0 L}{-\ddot{\beta}_0 L}}$$

where $f_R$ is an integration variable. According to Equation (13), o(t) is an inverse Fourier transform of $õ(f_t)$ and therefore, the convolution result of input optical signal x(t) and a desired Green's function g(t), as stated in Equation (11).

Other details of steps 110-114 may be similar to those of steps 102-106. Specifically, an exemplary embodiment of step 110 may be similar to step 102, an exemplary embodiment of step 112 may be similar to step 104, and an exemplary embodiment of step 114 may be similar to step 106.

In an exemplary embodiment, method 100 may overcome inherent speed limitations of electronic signal processors, due to an all-optical implementation, which may result in high-speed processing capability. In an exemplary embodiment, system 200 may be a good candidate for optical processing where large-scale manufacturing is required or compact size is a challenge. Broad applications of this system 200 may vary from spectroscopy to optical communications, due to a fully reconfigurable architecture of system 200 which allows for implementing arbitrary mathematical operations.

Example 1

Figure 4:
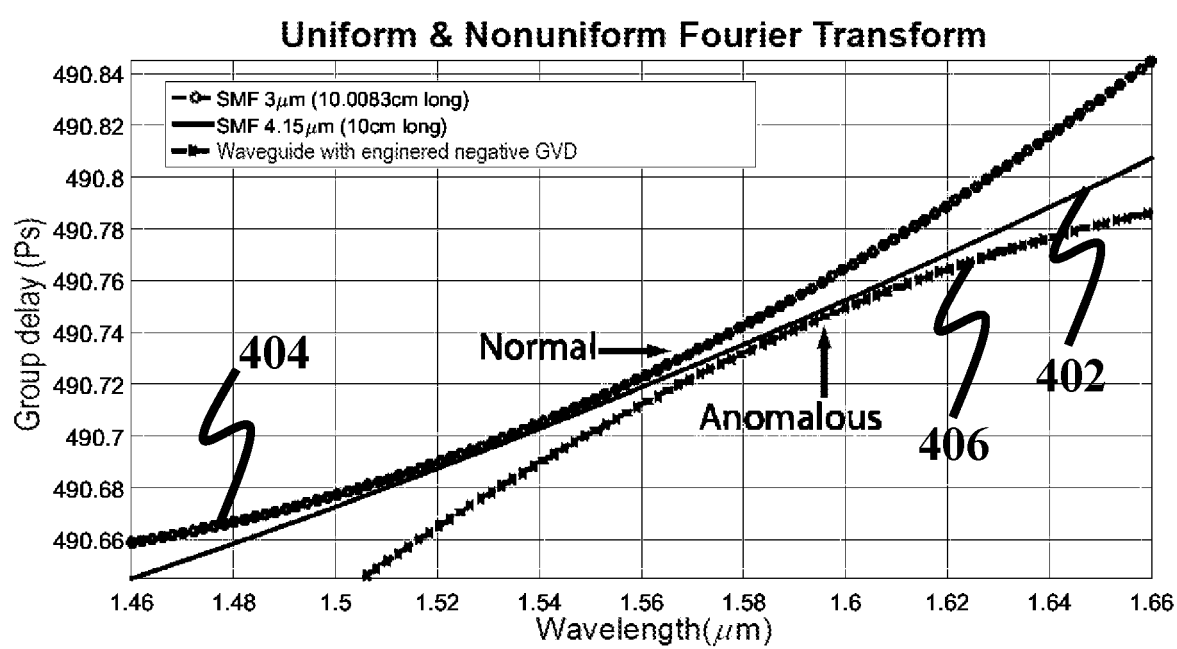
FIG. 4 shows variation of group delay versus signal modulation wavelength for a single mode fiber (SMF) waveguide with different core widths and lengths, consistent with one or more exemplary embodiments of the present disclosure.

In this example, engineering a dispersive waveguide for achieving different types of GVD is demonstrated. An exemplary single mode fiber (SMF) is designed with different core widths and different lengths to obtain different group delays. FIG. 4 shows variations of group delay versus signal modulation wavelength for an SMF waveguide with different core widths and lengths, consistent with one or more exemplary embodiments of the present disclosure. As shown in FIG. 4, a linear dispersion 402 leads to a uniform Fourier transform, whereas a normal dispersion 404 and an anomalous dispersion 406 lead to non-uniform Fourier transforms. A linear group-delay curve (frequency-time relation), i.e., zero $\beta_0^{(3)}$ in Equation (10), maps the input time samples linearly to output frequency samples which results in the uniform FT. In contrast, a non-linear group-delay curve, i.e., a nonzero $\beta_0^{(3)}$ in Equation (10), transfers uniform time samples to non-uniform output frequency samples. The non-uniform FT may also be acceptable as dispersion curves may be known for each structure because multiplication and inverse FT may also be performed with the same sampling pattern of the group-delay curve.

Figure 5A:
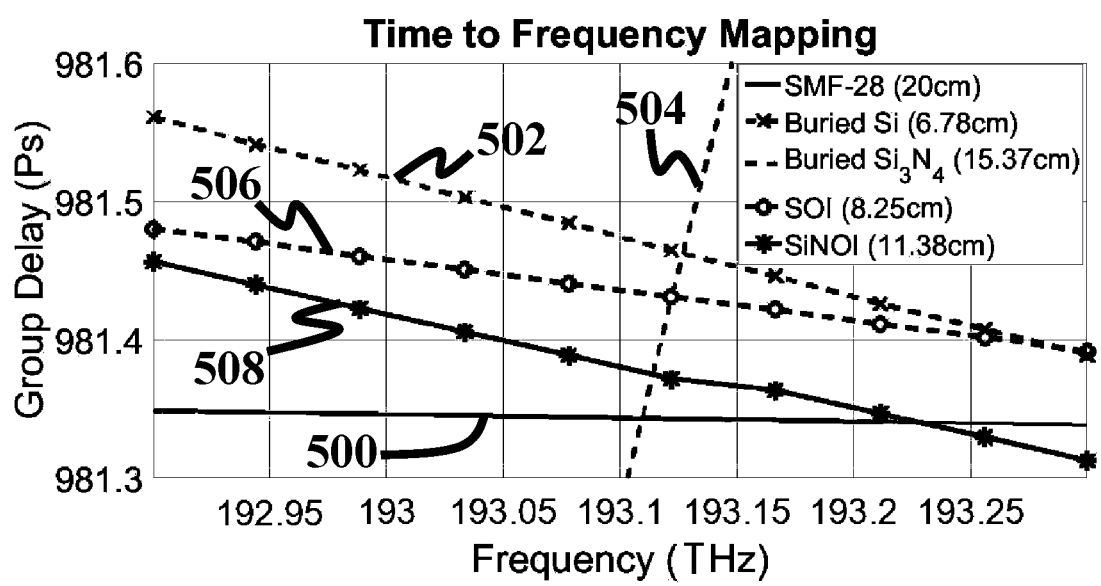
FIG. 5A shows a linear group delay for a single mode fiber and different waveguide structures, consistent with one or more exemplary embodiments of the present disclosure.
Figure 5B:
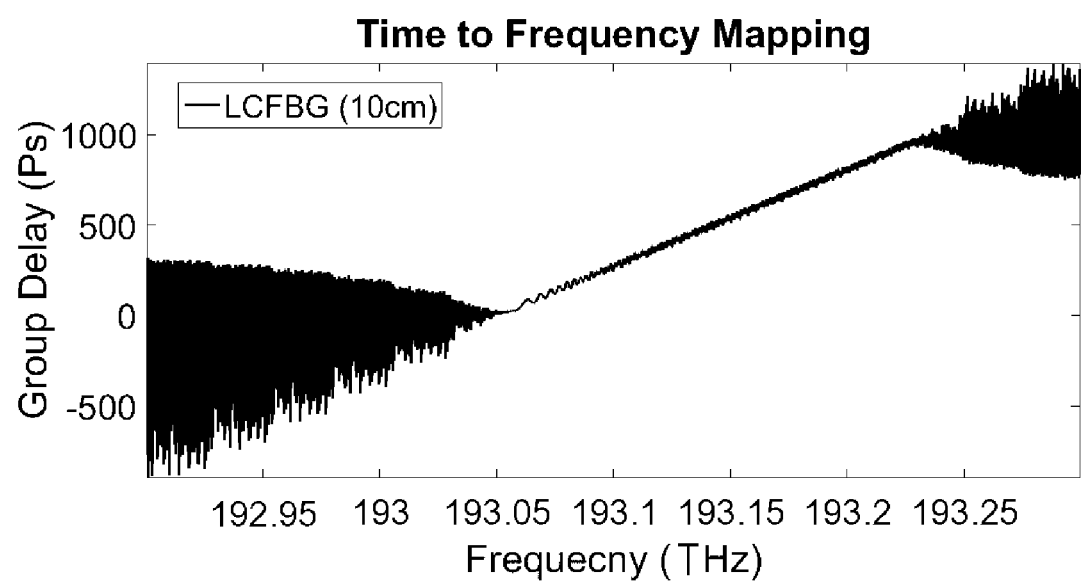
FIG. 5B shows a group delay for a linearly chirped fiber brag grating (LCFBG) and a photonic crystal waveguide, consistent with one or more exemplary embodiments of the present disclosure.

FIG. 5A shows a linear group delay for an SMF 500 and different waveguide structures, consistent with one or more exemplary embodiments of the present disclosure. Exemplary waveguide structures include a buried Si 502, a buried $Si_3N_4$ in $SiO_2$ 504, a silicon on $SiO_2$ 506, and a SiN on $SiO_2$ as an insulator 508 with waveguide cross section areas of about 0.5×0.18 µm², 0.5×0.18 µm², 1.15×1.35 µm², and 1.15×1.35 µm², respectively. FIG. 5B shows a group delay for a linearly chirped fiber brag grating (LCFBG), consistent with one or more exemplary embodiments of the present disclosure. An exemplary LCFBG includes sine shape variations of refractive index and periodicity from about 0.53433 to about 0.53482 µm, and a total chirp of about 0.5 nm, which clearly shows a constant GVD with ripples. As shown in FIGS. 5A and 5B, the group delay curves for these structures are approximately linear or have a linear differentiation. Therefore, they may be appropriate for dispersive-Fourier transformation.

According to FIGS. 5A and 5B, for example, silicon on insulator waveguide 508 of an approximate length of L=6.78 cm has a constant GVD of about $$\ddot{\beta}_0 = 7.374 \times 10^3 \left(\frac{ps^2}{km}\right)$$

in a frequency range of about 193.9 to about 194.4 THz, which corresponds to a 500 GHz bandwidth, which may be appropriate for high-speed optical communication systems. The GVD value, depending on the type of the dispersive medium, may vary between about 26.8 ps²/km for SMF 500 to about 5×10⁷ ps²/km for LCFBG, as represented by the slope of respective dispersion curves in FIGS. 5A and 5B. According to the GVD value of LCFBG and given that for a T=10 ps, the input pulse the chirp phase modulation factor b may be set larger than $$\left(\frac{1}{T}\right)^2 = 10^{-2} \text{ ps}^{-2},$$

the length of the waveguide may be chosen to be approximately as small as 1 mm. Therefore, the chirp phase modulation factor may be adjusted with respect to GVD in a way to reduce the required waveguide length, making it practical for an on-chip implementation.

Example 2

In this example, different Green's functions corresponding to a differentiator and an integrator, as well as a Green's function of an arbitrary shape, are implemented through an exemplary structure. The exemplary structure includes two silicon on insulator dispersive waveguides with up to second order dispersion coefficients, a height H, a width W, and a length $L_w$ for both FT and IFT. An exemplary MZI-based optical modulator with a length $L_M$ is placed in between for multiplying an arbitrary Green's function in the Fourier domain, where M refers to parameters with the MZI-based optical modulator.

In order to implement the first-order differentiation by the exemplary structure, the Green's function produced by an exemplary modulator may obey the relation $\tilde{g}(f_t) \propto (jf_t + jf_{t_0})$, where $f_{t_0}$ is an offset frequency corresponding to time instance t=0. The parameter $f_{t_0}$ is added to avoid multiplication by zero at t=0. Green's function $\tilde{g}(f_t)$, when multiplied by an FT of an input signal resulted from a dispersive waveguide with a positive GVD and then passed through a waveguide with a negative GVD for performing IFT, yields a first-order differentiation of the input. To implement an $n^{th}$ order differentiator, these temporal optical computing (TOC) blocks may be put in series or the Green's function may be modified in the modulator as follows:

$$\tilde{g}(f_t) \propto (jf_t + jf_{t_0})^n$$

For the integration operation, the Green's function produced by the modulator may be as follows:

$$\tilde{g}(f_t) \propto \left(jf_{t_0} + \frac{d}{jf_t}\right)^{-1}$$

where d is a normalization constant which is used to avoid the modulator gain requirement. An $n^{th}$ order integrator may also be accomplished using these TOC blocks in series or by changing the modulator Green's function to $\tilde{g}(f_t) \propto (jf_{t_0} + d/jf_t)^{-n}$.

Convolution is an important process in optical computing. Convolution with an arbitrary kernel may be described as follows:

$$\tilde{g}(f_t) \propto \Im\{u(t)\}$$

where u(t) is an arbitrary kernel.

All the above Green's functions are simulated and compared with ideal results through the Schrodinger equation and a dispersion parameter of a waveguide obtained from a photonic crystal (PC) waveguide. A main part of the PC waveguide is a low-loss $Si_3N_4$ rectangular core with about 1 µm width and about 400 µm thickness. A $Si/SiO_2$ photonic crystal layer underlying the core include a two-dimensional triangular lattice of $SiO_2$ pillars with a pitch of about 400 nm embedded in a host Si layer. The diameter of SiO2 pillar is about 250 nm. A thin SOI layer (about 100 nm thickness) serves as a host medium for the PC layer, and a buried oxide layer with about 1 µm thickness in an SOI wafer as bottom cladding. Moreover, in exemplary simulations, it is assumed that $L_p = L_w = 10.56$ mm, $L_M = 4$ mm, H=400 nm, W=1 µm, $$\dot{\beta}_p = \dot{\beta}_w = 3.7735 \times 10^4 \frac{ps}{km}, \ddot{\beta}_p = \ddot{\beta}_w = 2.81 \times 10^6 \left(\frac{ps^2}{km}\right),$$

b=1.67×10⁻² ps⁻², d=1 ps and $$x(t) = te^{-\left(\frac{2t}{T_p}\right)^2}$$

where $T_p$=0.1 ns is the input pulse width.

Figure 6A:
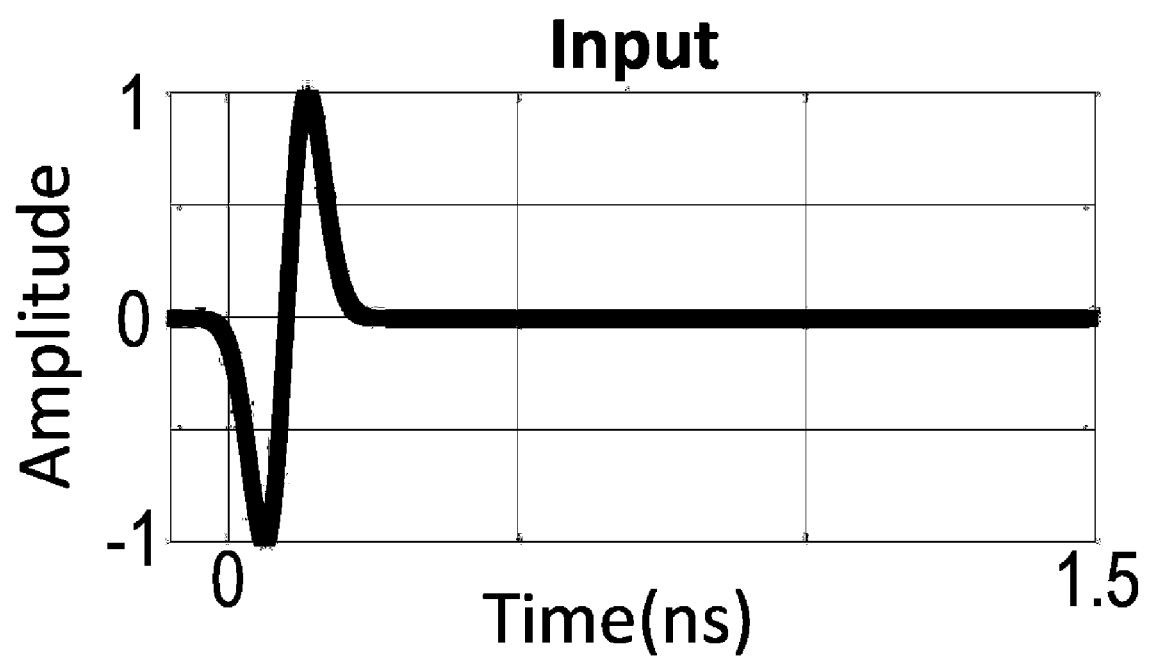
FIG. 6A shows variations of an input signal in the time domain, consistent with one or more exemplary embodiments of the present disclosure.
Figure 6B:
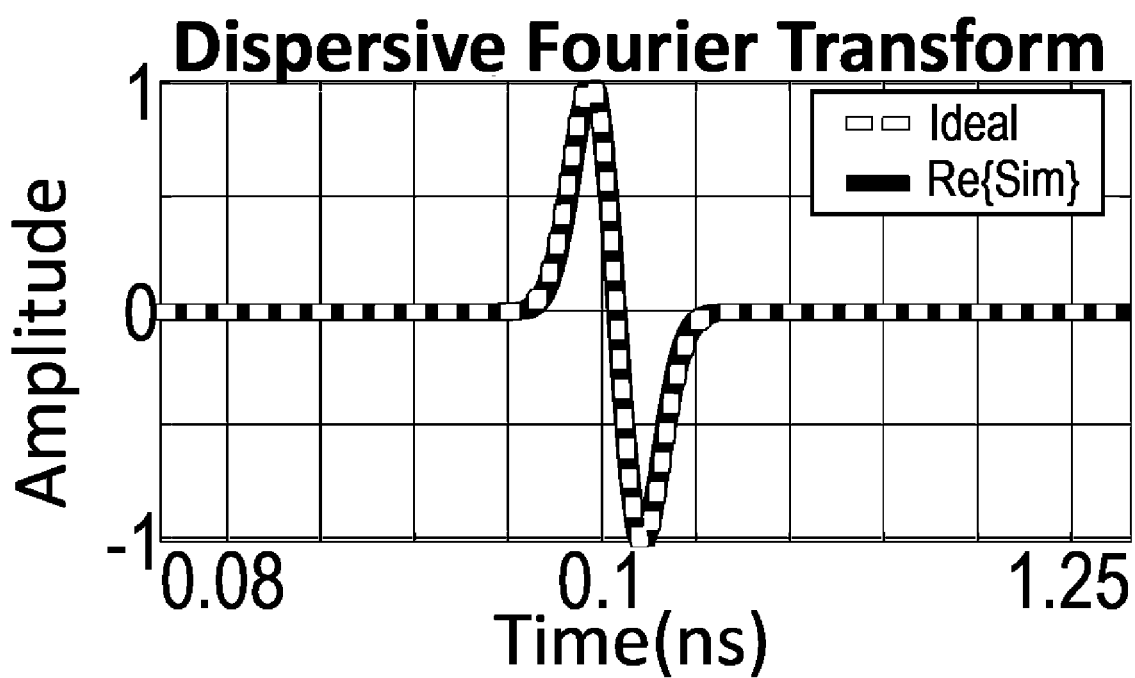
FIG. 6B shows variations of a Fourier transform of an input signal in the frequency domain, consistent with one or more exemplary embodiments of the present disclosure.
Figure 6C:
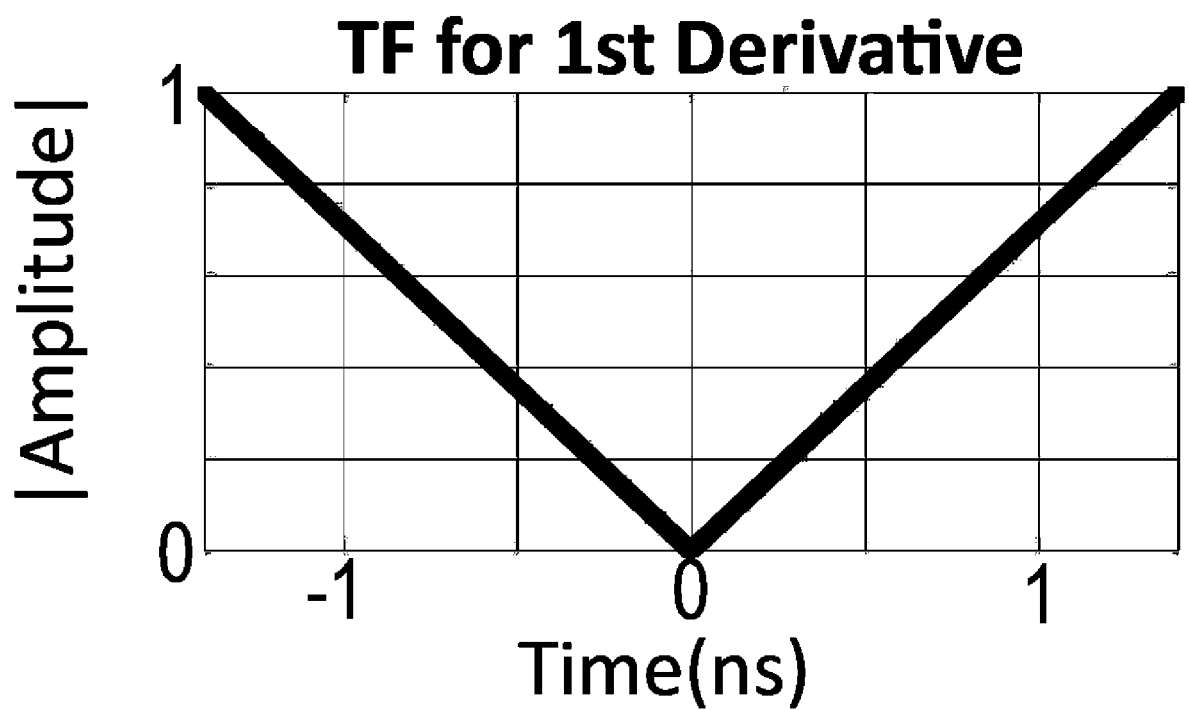
FIG. 6C shows magnitude variations of a differentiation transfer function corresponding to a Green's function of differentiation, consistent with one or more exemplary embodiments of the present disclosure.
Figure 6D:
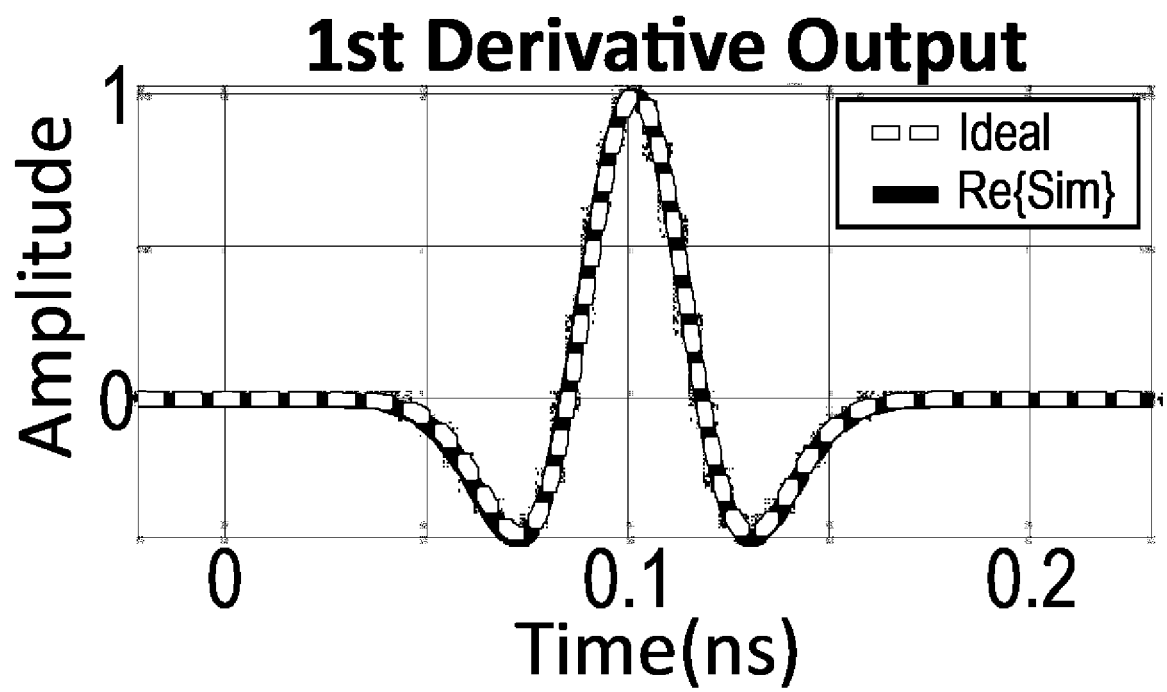
FIG. 6D shows variations of a first derivative output of an input signal corresponding to a differentiation transfer function, consistent with one or more exemplary embodiments of the present disclosure.
Figure 6E:
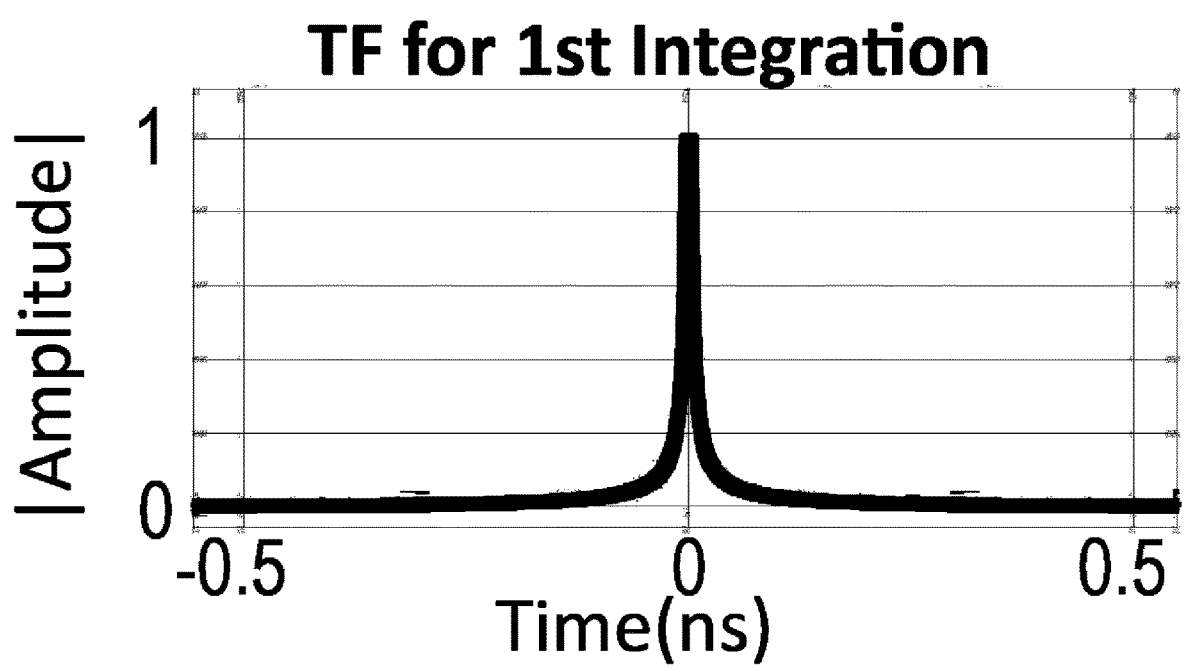
FIG. 6E shows magnitude variations of an integration transfer function corresponding to a Green's function of integration, consistent with one or more exemplary embodiments of the present disclosure.
Figure 6F:
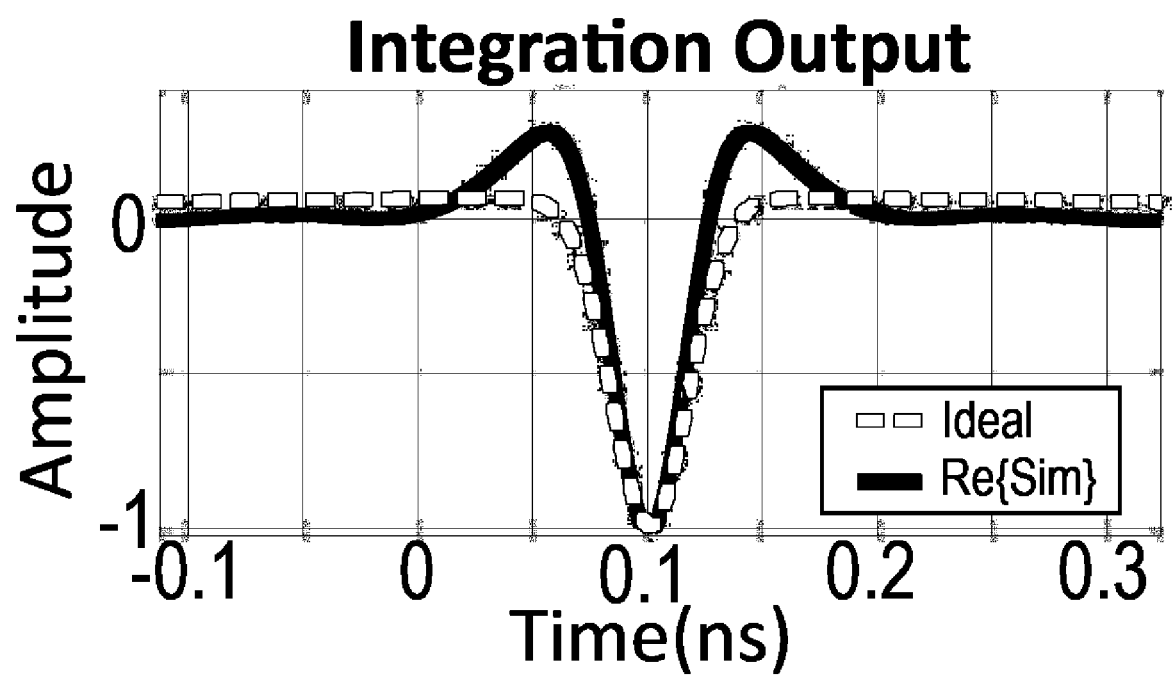
FIG. 6F shows variations of a first integral output of an input signal corresponding to an integration transfer function, consistent with one or more exemplary embodiments of the present disclosure.
Figure 6G:
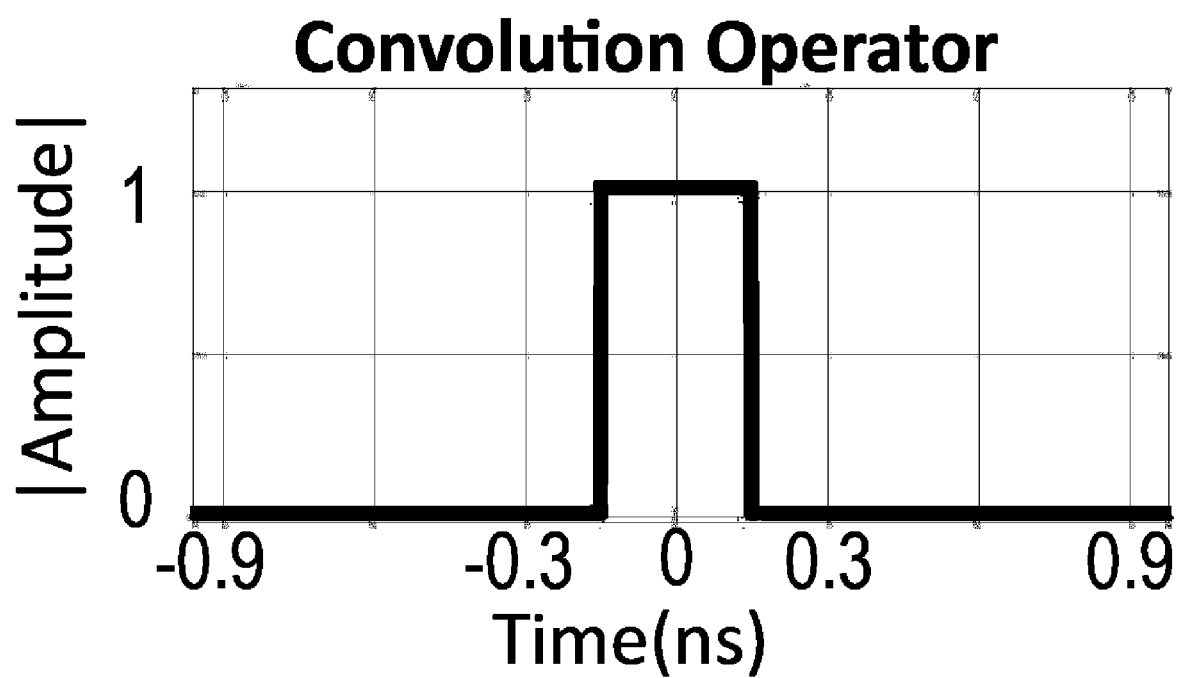
FIG. 6G shows magnitude variations of a rectangular convolution operator corresponding to a Green's function of convolution, consistent with one or more exemplary embodiments of the present disclosure.
Figure 6H:
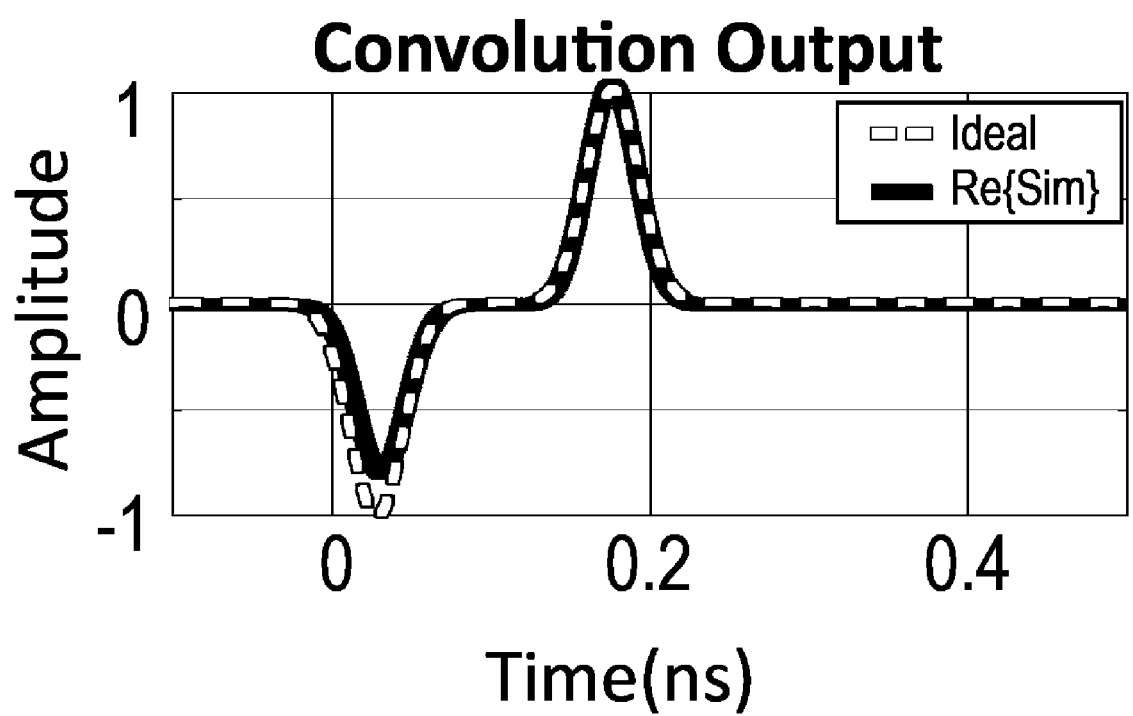
FIG. 6H shows variations of a convolved output of an input signal with a rectangular convolution operator, consistent with one or more exemplary embodiments of the present disclosure.

FIG. 6A shows variations of input signal x(t) in the time domain, consistent with one or more exemplary embodiments of the present disclosure. FIG. 6B shows variations of the Fourier transform of input signal x(t) in the frequency domain, consistent with one or more exemplary embodiments of the present disclosure. FIG. 6C shows magnitude variations of a differentiation transfer function corresponding to the Green's function of differentiation, consistent with one or more exemplary embodiments of the present disclosure. FIG. 6D shows variations of a first derivative output of input signal x(t) corresponding to the differentiation transfer function, consistent with one or more exemplary embodiments of the present disclosure. FIG. 6E shows magnitude variations of an integration transfer function corresponding to the Green's function of integration, consistent with one or more exemplary embodiments of the present disclosure. FIG. 6F shows variations of a first integral output of input signal x(t) corresponding to the integration transfer function, consistent with one or more exemplary embodiments of the present disclosure. FIG. 6G shows magnitude variations of a rectangular convolution operator corresponding to the Green's function of convolution, consistent with one or more exemplary embodiments of the present disclosure. FIG. 6H shows variations of a convolved output of input signal x(t) with the rectangular convolution operator, consistent with one or more exemplary embodiments of the present disclosure.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for reconfigurable optical signal processing, the system comprising:
  a Fourier transformation unit configured to generate a Fourier transform of an input optical signal, the Fourier transformation unit comprising:
    a first dispersive medium configured to:
      generate a first chirped pulse by propagating a first input pump through the first dispersive medium, the first input pump comprising a Gaussian shaped optical wave;
      generate a first idler signal by applying a four wave mixing (FWM) process on the input optical signal and the first chirped pulse; and
      extract a first modulated signal from the first idler signal by passing the first idler signal through a first band-pass filter; and
    a second dispersive medium configured to generate the Fourier transform by propagating the first modulated signal through the second dispersive medium;

a multiplication unit configured to generate a multiplied signal by multiplying the Fourier transform by a Green's function; and an inverse Fourier transform unit configured to generate an inverse Fourier transform of the multiplied signal, the inverse Fourier transform unit comprising:
a third dispersive medium configured to:
generate a second chirped pulse by propagating a second input pump through the third dispersive medium, the second input pump comprising a Gaussian shaped optical wave;
generate a second idler signal by applying the FWM process on the multiplied signal and the first chirped pulse; and
extract a second modulated signal from the second idler signal by passing the second idler signal through a second band-pass filter; and
a fourth dispersive medium configured to generate the inverse Fourier transform of the multiplied signal by propagating the second modulated signal through the fourth dispersive medium.

2. The system of claim 1, wherein the first dispersive medium comprises a first dispersive waveguide with a first length $L_p$ and a first group velocity dispersion (GVD) $\ddot{\beta}_p$, the first length $L_p$ satisfying a condition defined by the following:

$$\frac{\tau_{max}}{2\ddot{\beta}_p \Omega} < L_p < \frac{T_i}{20\ddot{\beta}_p},$$

where:
$\tau_{max}$ is a maximum threshold of computation time,
$\Omega$ is a spectral bandwidth of the first chirped pulse, and
$T_i$ is a width of the input optical signal.

3. The system of claim 2, wherein the second dispersive medium comprises a second dispersive waveguide with a second length $L_w$ and a second GVD $\ddot{\beta}_w$, the second length $L_w$ satisfying a condition defined by the following:

$$0.9 \times L_p \frac{\ddot{\beta}_p}{\ddot{\beta}_w} < L_w < 1.1 \times L_p \frac{\ddot{\beta}_p}{\ddot{\beta}_w}.$$

4. The system of claim 1, wherein:
the first dispersive medium comprises a first spiral dispersive waveguide with a first linear positive-slope group velocity dispersion (GVD) $\ddot{\beta}_p$;
the second dispersive medium comprises a second spiral dispersive waveguide with a second linear positive-slope GVD $\ddot{\beta}_w$;
the third dispersive medium comprises a third spiral dispersive waveguide with a third linear negative-slope GVD $\ddot{\beta}_p'$; and
the fourth dispersive medium comprises a fourth spiral dispersive waveguide with a fourth linear negative-slope GVD $\ddot{\beta}_w'$.

5. The system of claim 1, wherein each of the first dispersive medium, the second dispersive medium, the third dispersive medium, and the fourth dispersive medium comprises utilizing one of a single mode fiber, a linearly chirped fiber-brag-grating (FBG), a silicon nitride waveguide, a photonic crystal waveguide, or a spiral Hydex waveguide.

6. The system of claim 1, wherein each of the first band-pass filter and the second band-pass filter comprises a band-pass Bragg grating.

7. The system of claim 1, wherein generating the multiplication unit comprises a cascaded silicon Mach-Zehnder Interferometer (MZI) optical modulator and a phase modulator, the cascaded silicon MZI optical modulator comprising an optical waveguide and a beam splitter.

8. A photonic integrated circuit (PIC) for reconfigurable optical signal processing, the PIC comprising:
a first dispersive medium configured to:
generate a first chirped pulse by propagating a first input pump through the first dispersive medium, the first input pump comprising a Gaussian shaped optical wave;
generate a first idler signal by applying a four wave mixing (FWM) process on the input optical signal and the first chirped pulse; and
extract a first modulated signal from the first idler signal by passing the first idler signal through a first band-pass Bragg grating, the first dispersive medium comprising a first spiral dispersive waveguide with a first length $L_p$ and a first linear positive-slope group velocity dispersion (GVD) $\ddot{\beta}_p$, the first length $L_p$ satisfying a condition defined by the following:

$$\frac{\tau_{max}}{2\ddot{\beta}_p \Omega} < L_p < \frac{T_i}{20\ddot{\beta}_p},$$

where:
$\tau_{max}$ is a maximum threshold of computation time,
$\Omega$ is a spectral bandwidth of the first chirped pulse, and
$T_i$ is a width of the input optical signal;
a second dispersive medium configured to generate a Fourier transform of the input optical signal by propagating the first modulated signal through the second dispersive medium, the second dispersive medium comprising a second spiral dispersive waveguide with a second length $L_w$ and a second linear positive-slope GVD $\ddot{\beta}_w$, the second length $L_w$ satisfying a condition defined by the following:

$$0.9 \times L_p \frac{\ddot{\beta}_p}{\ddot{\beta}_w} < L_w < 1.1 \times L_p \frac{\ddot{\beta}_p}{\ddot{\beta}_w};$$

a cascaded silicon Mach-Zehnder Interferometer (MZI) optical modulator and a phase modulator, configured to generate a multiplied signal by multiplying the Fourier transform by a Green's function, the cascaded silicon MZI optical modulator comprising an optical waveguide and a beam splitter;
a third dispersive medium configured to:
generate a second chirped pulse by propagating a second input pump through the third dispersive medium, the second input pump comprising a Gaussian shaped optical wave;
generate a second idler signal by applying the FWM process on the multiplied signal utilizing the first chirped pulse; and
extract a second modulated signal from the second idler signal by passing the second idler signal through a second band-pass Bragg grating, the third dispersive medium comprising a third spiral dispersive waveguide with a third linear negative-slope GVD $\ddot{\beta}_p{}'$; and a fourth dispersive medium configured to generate an inverse Fourier transform of the multiplied signal by propagating the second modulated signal through the fourth dispersive medium, the fourth dispersive medium comprising a fourth spiral dispersive waveguide with a fourth linear negative-slope GVD $\ddot{\beta}_w{}'$.

* * * * *